US006999827B1

(12) United States Patent
Yong

(10) Patent No.: US 6,999,827 B1
(45) Date of Patent: Feb. 14, 2006

(54) AUTO-DETECTION OF AUDIO INPUT FORMATS

(75) Inventor: Yan Kang Yong, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 09/456,855

(22) Filed: Dec. 8, 1999

(51) Int. Cl.
*G06F 17/00* (2006.01)
*H04R 29/00* (2006.01)

(52) U.S. Cl. ........................... 700/94; 381/58; 715/727

(58) Field of Classification Search .................. 700/94; 381/56, 58, 119, 123; 710/15, 72, 38, 16; 715/716, 717, 718, 727; 84/645
See application file for complete search history.

(56) References Cited

U.S. PATENT DOCUMENTS

| | | | | |
|---|---|---|---|---|
| 5,177,728 | A * | 1/1993 | Otsubo et al. | 369/47.24 |
| 5,570,393 | A * | 10/1996 | Kho | 375/333 |
| 5,748,835 | A * | 5/1998 | Lee | 386/104 |
| 5,832,024 | A * | 11/1998 | Schotz et al. | 375/134 |
| 5,928,342 | A * | 7/1999 | Rossum et al. | 710/74 |
| 6,038,400 | A * | 3/2000 | Bell et al. | 710/11 |
| 6,081,783 | A * | 6/2000 | Divine et al. | 704/500 |
| 6,128,681 | A * | 10/2000 | Shephard | 710/71 |
| 6,205,223 | B1 * | 3/2001 | Rao et al. | 380/42 |
| 6,483,988 | B1 * | 11/2002 | Noguchi et al. | 386/96 |
| 6,748,472 | B1 * | 6/2004 | Knudsen | 710/260 |

FOREIGN PATENT DOCUMENTS

JP 2002-347787 * 3/2002

* cited by examiner

*Primary Examiner*—Xu Mei
(74) *Attorney, Agent, or Firm*—Russell N. Swerdon

(57) ABSTRACT

Auto-detection of audio formats is provided by using an auto-detect element to exploit differences among multiple formats to output a format select signal corresponding to the input to the auto-detect element. In a preferred embodiment, edge detection circuitry and a time counter are employed to recognize multiple audio formats automatically. The format select signal output from the auto-detect element is output to a multiplexer, or other switching means for switching among multiple input formats, so that the correct input signal processing is used. The auto-detect element removes the need for an external hardware select pin, thereby reducing the number of input pins to the circuit.

18 Claims, 12 Drawing Sheets

PRIOR ART

PRIOR ART

AUTO-DETECTION OF AUDIO INPUT FORMATS

FIELD OF THE INVENTION

The present invention relates generally to electronic circuit design. More particularly, the present invention relates to the electronic circuitry for and a method for auto-detecting format(s) of multiple audio inputs.

BACKGROUND OF THE INVENTION

There has recently been tremendous growth in the area of digital electronics. The use of digital signals for transmitting and conveying data accurately for storage, reproduction or rendering has steadily increased with advances in digital technology. This growth has occurred in part because digital signals offer many advantages for certain types of design applications. However, along with this explosive growth in digital electronics, there has been a concomitant growth of competing digital formats, partially due to different design applications tending to different formats and the promotion of different formats by different companies. For the case of a digital input signal for which the designer knows the formatting, e.g., Format X, it can be a straightforward task to design the inputs of a system to receive Format X signals. Generally, the designer would read the specification for Format X and design the system to conform to Format X signals.

However, when the designer is blind to the formatting of the input signal i.e., when the designer does not know whether an input signal will be formatted according to Format X, Format Y, or another format, a difficulty arises with respect to processing the input signal. Format X signals generally can not be processed correctly in a system expecting Format Y signals, and vice versa. For example, two competing digital audio signal formats are the I2S and SPDIF formats. Data in I2S signals are formatted/encoded differently than data in SPDIF signals. Accordingly, the designer presently has to know the format of inputs to such a digital audio system in advance in order to efficiently process the digital audio inputs.

In addressing the above problem of unknown formatting of input signals, it has been proposed that a multiplexer be employed, having a multiplexer select, such that a system outputs one signal according to one multiplexer select voltage (e.g., 5 V), and the system outputs another signal according to another multiplexer select voltage (e.g., 0 V). However, at present, an additional multiplexer select circuit pin is required to accommodate the multiplexer select input. As a result, some external means for correctly setting the select pin according to the input into the system needs to be provided.

Thus, it would be advantageous to provide a circuit having audio input format auto detection capabilities such that a designer could design a circuit that is independent of audio input format. It would be further advantageous to provide such a circuit with a minimum pin count and without an external formatting select pin. The present invention has been developed to meet these needs in the art.

SUMMARY OF THE INVENTION

In consideration of the above shortcomings relating to differently formatted audio inputs, the present invention relates to a circuit that provides auto-detection of audio formats by using an auto-detect element to exploit differences among multiple formats to output a format select signal corresponding to the input to the auto-detect element. In a preferred embodiment, edge detection circuitry and a time counter are employed to recognize multiple audio formats automatically. The format select signal output from the auto-detect element is output to a multiplexer, or other switching means for switching among multiple input formats, so that the correct input signal processing is used. The auto-detect element removes the need for an external hardware select pin, thereby reducing the number of input pins to the circuit.

Other aspects of the present invention are described below.

BRIEF DESCRIPTION OF THE DRAWINGS

The circuitry and method for auto-detection of input formats in accordance with the present invention are further described with reference to the accompanying drawings in which.

DETAILED DESCRIPTION OF PREFERRED EMBODIMENTS

Figure 1A:
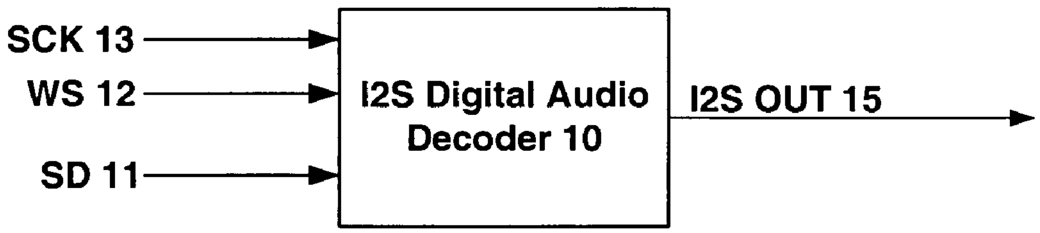
FIG. 1A is a block diagram of an I2S digital audio decoder.

Thus there have been described some of the difficulties associated with designing a circuit independently of audio input format, when multiple input formats are possible as an input to a system. For instance, format X signals generally can not be processed correctly in a system expecting Format Y or Z signals; Format Y signals generally can not be processed correctly in a system expecting Format X or Z signals, and so on.

For a more specific example, SPDIF and I2S are two different audio input formats that are commonly used to represent digital audio, and commonly used to carry a stereo signal i.e., a signal carrying a left channel and a right channel. However, because of differences in the way that the data is encoded, I2S signals can not be processed in the same way that SPDIF signals are processed, and vice versa. More specifically, differences in sampling rate, encoding and number of signals used to represent audio are responsible for differences in decoding, further processing, etc. of signals of I2S and SPDIF formats. As known to those skilled in the art, the I2S audio format is an audio standard employed by Philips, and a comprehensive specification can be obtained therefor from Philips Semiconductors. In accordance with this standard, three signals can be used as an interface for the interconnection of digital audio equipment and integrated circuits. The three signals are: SD—Audio Serial Data Input Signal, WS—Word Select Signal and SCK—Serial Clock signal. This tri-signal interface is typically employed to carry stereo audio, with a relatively high resolution of up to 32 bits per sample, at a sampling rate ranging from 4 Khz to 196 KHz.

The SD, WS and SCK signals are interrelated. The SD signal carries the sampled audio data. The frequency of the WS signal determines the sampling frequency, and the voltage level of the WS signal denotes the channel for which the SD signal is carrying data. The SCK signal is used to sample the audio data SD either by the trailing (HIGH-to-LOW) or the leading (LOW-to-HIGH) edge.

The resolution of the audio data SD can range from 8 to 32 bits. In one sample period, there are two audio data points represented, for left and right channels. The SCK signal clock cycle is calculated to be two times the audio resolution. Based on the sampling rate ranging from 4 Khz to 196 KHz, time slots for data bits range from 250 $\mu$s to 5.2 $\mu$s.

The SPDIF audio format is an international standard (IEC 958) used to represent audio data, and a comprehensive specification therefor can be obtained from the Audio Engineering Society. This standard describes a serial, unidirectional, self clocking interface for the interconnection of digital audio equipment, typically employed in consumer and professional applications.

The SPDIF interface is primarily intended to carry stereo audio, with resolution of up to 24 bits per sample, at a sampling rate of 32, 44.1, 48, 96, or 192 KHz. The sample rate is the frequency with which an audio signal is interpreted by recording a sample. These samples together form digital sample data. For each stereo audio sample, the sample is represented by a frame (or 2 sub-frames). Each frame has a total of 64 time slots, wherein a time slot is the minimum time duration to represent 1 bit of audio signal. Based on the sampling rate ranging from 32 KHz to 192 KHz, time slots range from 488.28 ns to 81.38 ns.

Figure 1B:
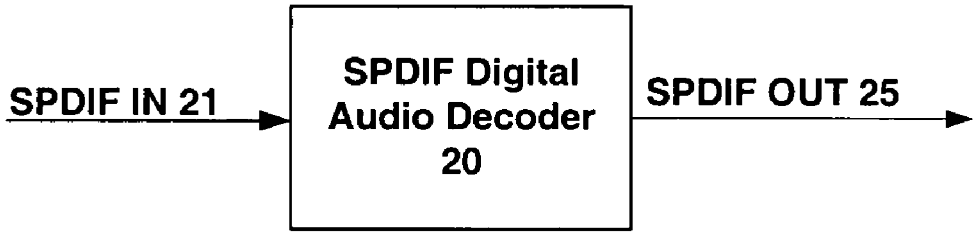
FIG. 1B is a block diagram of an SPDIF digital audio decoder.

Since different audio formats require different processing, previously it was necessary to provide separate circuits for separate audio input formats. For example, as shown in FIG. 1A, an I2S digital audio decoder 10 has inputs SD 11, WS 12 and SCK 13. The I2S decoder decodes the digital data based on these inputs to produce an I2S output signal 15. On the other hand, as shown in FIG. 1B, an SPDIF digital audio decoder 20 receives digital audio data from SPDIF IN input signal 21, decodes the input signal, and outputs a SPDIF OUT output signal 25. While the provision of separate circuits for separate audio formats avoids difficulties associated with format recognition, multiple circuits require design and manufacture to achieve this solution, which only increases design and manufacturing costs.

Figure 2:
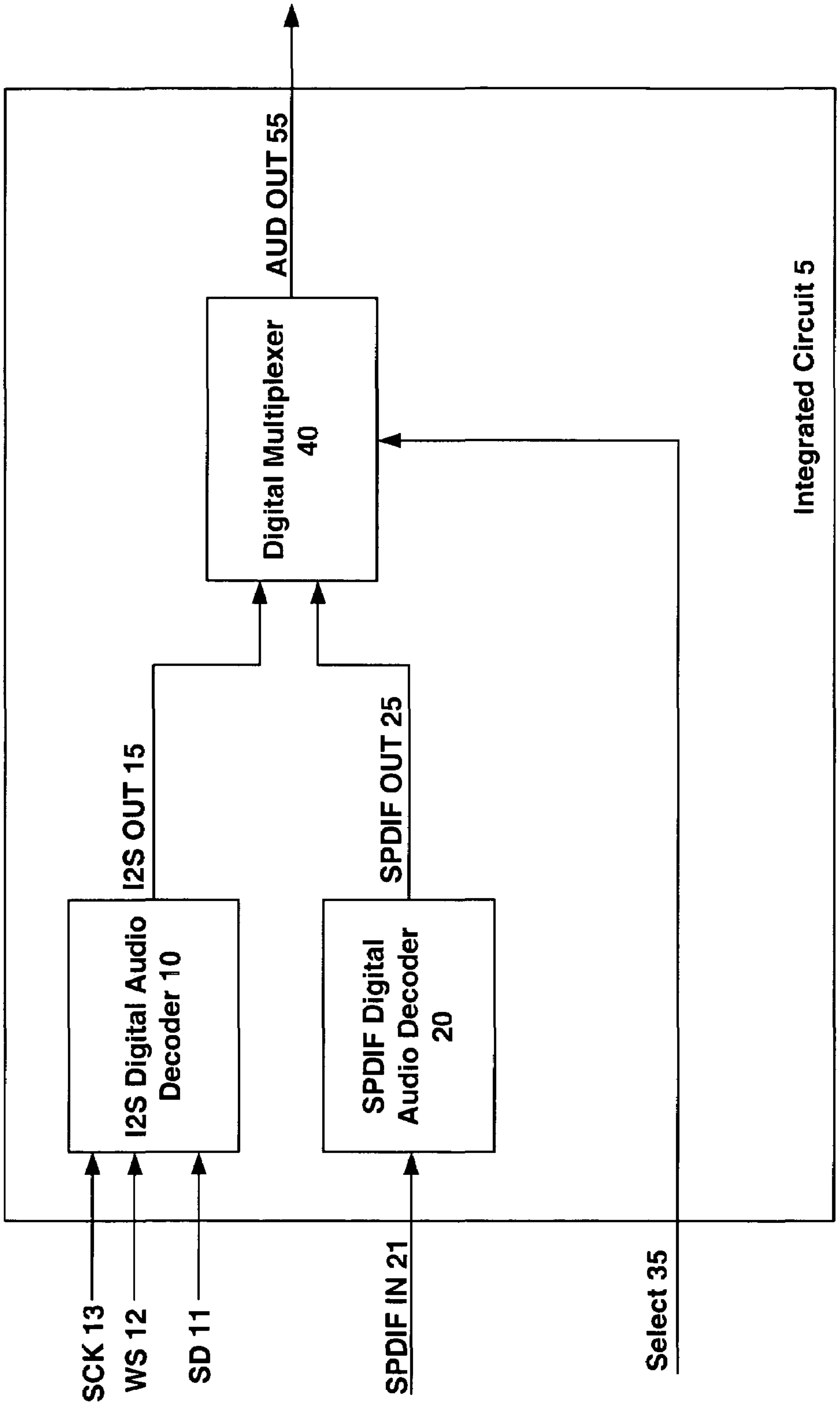
FIG. 2 is a block diagram of a circuit illustrating the use of a select signal input to select respective input signals.

Alternatively, as illustrated in FIG. 2, separate processing for differently formatted inputs can be implemented in the same chip or integrated circuit 5, by providing a multiplexer 40 and corresponding externally generated select signal in order to gate the correct input signal according to the select signal. I2s input signals 11, 12, 13, I2s decoder 10 and I2S output signal 15 have been incorporated into the design of integrated circuit 5. Similarly, SPDIF IN 21, SPDIF decoder 20, and output signal SPDIF OUT 25 have been incorporated into the design of integrated circuit 5. I2S and SPDIF output signals 15 and 25 are then input to digital multiplexer 40. Select signal 35, as an input to integrated circuit 5 and multiplexer 40, controls which of I2S OUT 15 and SPDIF OUT 25 is carried by the audio output signal AUD OUT 55.

As explained previously, this design incorporates processing of multiple input formats in a single integrated circuit design; however, at additional cost, this design requires an additional external means to correctly set select signal 35 to correspond to the appropriate input signal. Further, the provision of an input select signal 35 to integrated circuit 5 increases the number of pins in the overall circuit design. Since integrated circuit pin-out has both design and cost implications, increasing the number of pins to a circuit is generally undesirable.

Figure 3:
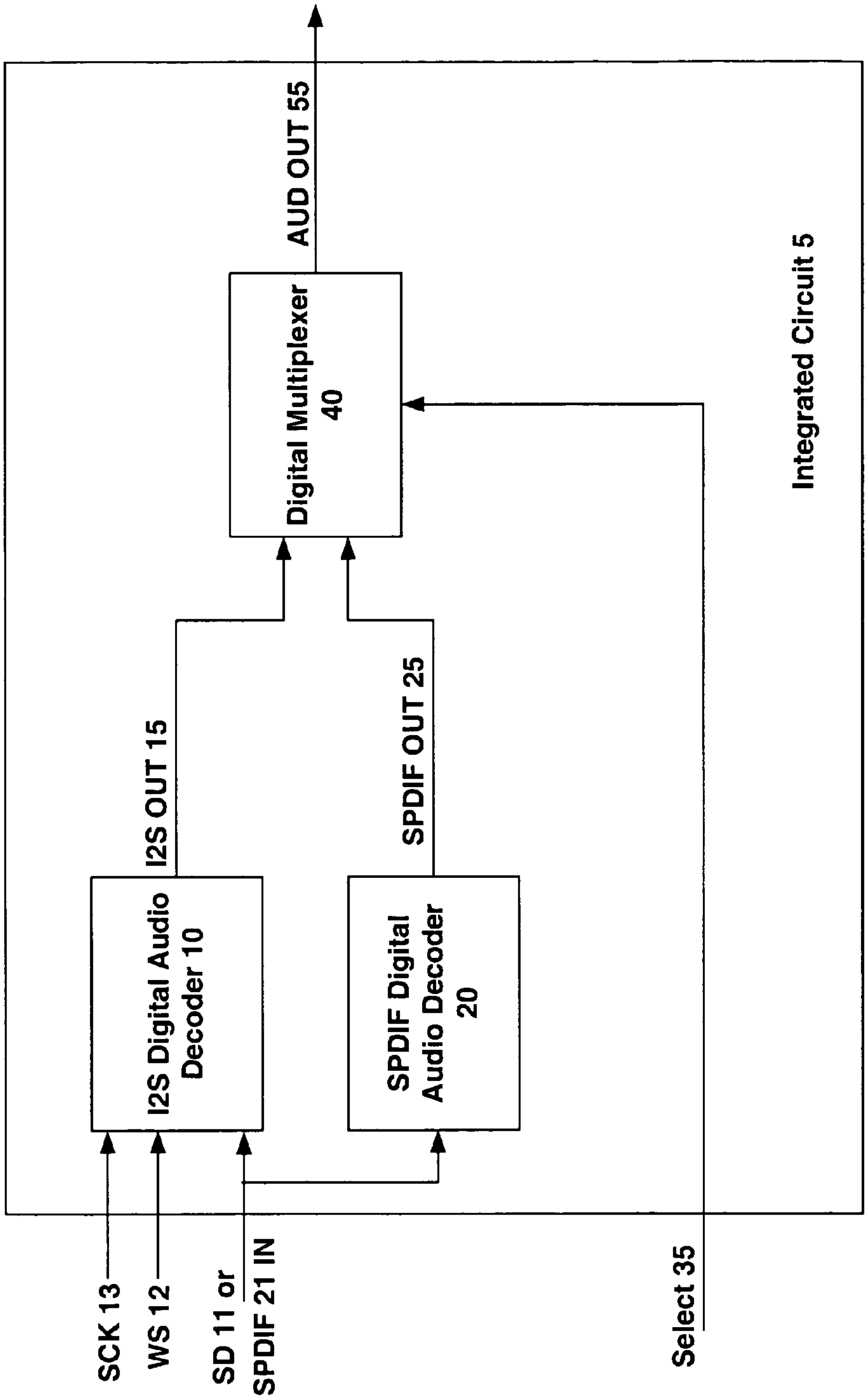
FIG. 3 is a block diagram of a circuit illustrating input signal multiplexing wherein pin-sharing is employed to reduce the number of input pins to the circuit in accordance with the present invention.

To address the problem of increased integrated circuit pin-out, input signals SD IN 11 and SPDIF IN 21 can share the same pin, by making an electrical connection between the two input signals, as shown in FIG. 3. However, the problem remains that an additional external means to correctly set select signal 35 to correspond to the appropriate input signal must be provided, thereby increasing manufacturing time and cost.

Figure 4:
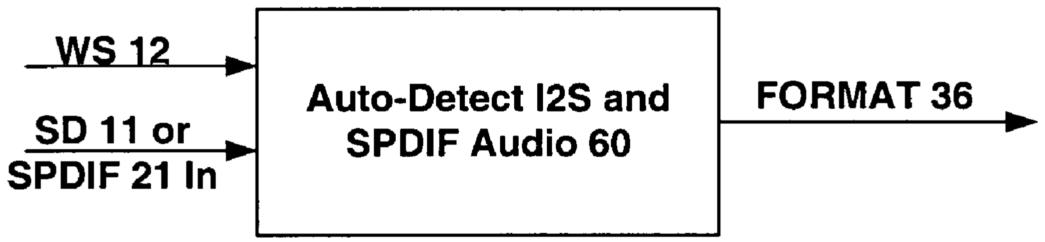
FIG. 4 is a block diagram of an audio input auto-detect element in accordance with the present invention.

Thus, in accordance with the present invention, as illustrated in FIG. 4, an auto-detect element 60 is provided for automatically detecting the signal format being carried by an input stream of data. In the case of the auto-detection of an audio signal formatted either with the I2S format or SPDIF format, in a preferred embodiment, input WS 12 of a potential I2S signal is input into the auto detect element 60, in addition to the shared data channel for a potential I2S 11 or SPDIF 21 signal. In a preferred embodiment, the SCK 13 is not required for auto-detection purposes.

Figure 5:
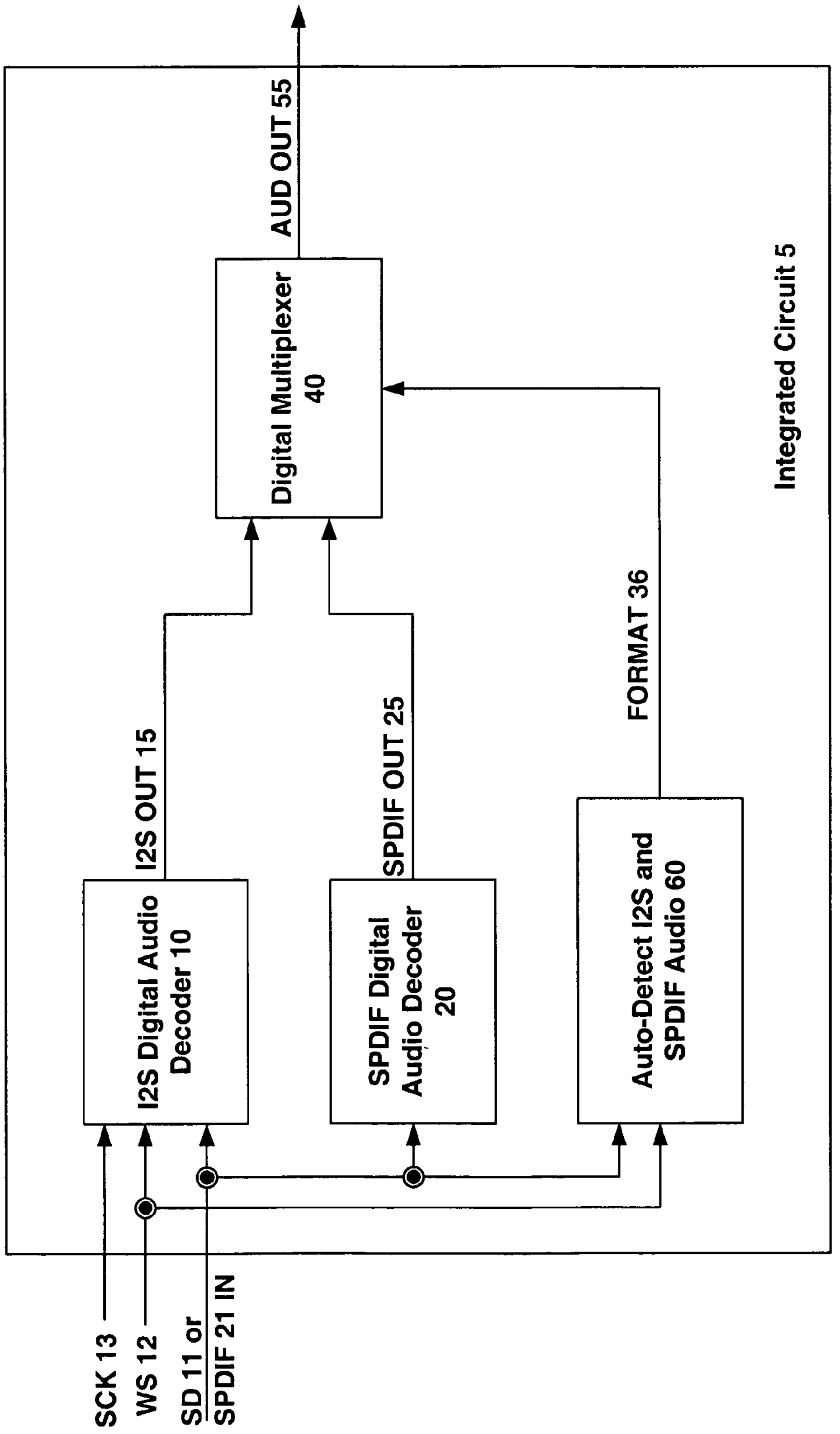
FIG. 5 is a block diagram of a circuit illustrating the use of pin-sharing, and an audio input auto-detect element to generate a format select signal to select input signals in accordance with the present invention.

Considering the time slot ranges for I2S and SPDIF signals, 81.38 ns to 488.28 ns and 5.2 $\mu$s to 250 $\mu$s, respectively, these signals are different. For a SPDIF time slot, values range in the nano-second range whereas for an I2S time slot, values range in the micro-second range. In a preferred embodiment, auto detect element 60 comprises edge detection circuitry and a time counter to detect the time slot difference between I2S and SPDIF input signals. Once the difference is detected, auto detect element 60 generates a format select signal 36 corresponding to the detected format of the input signal 11 or 21. As shown in FIG. 5, format select signal 36 can be input to multiplexer 40 to gate the correct output signal 15 or 25 to AUD OUT output signal 55.

Figure 6:
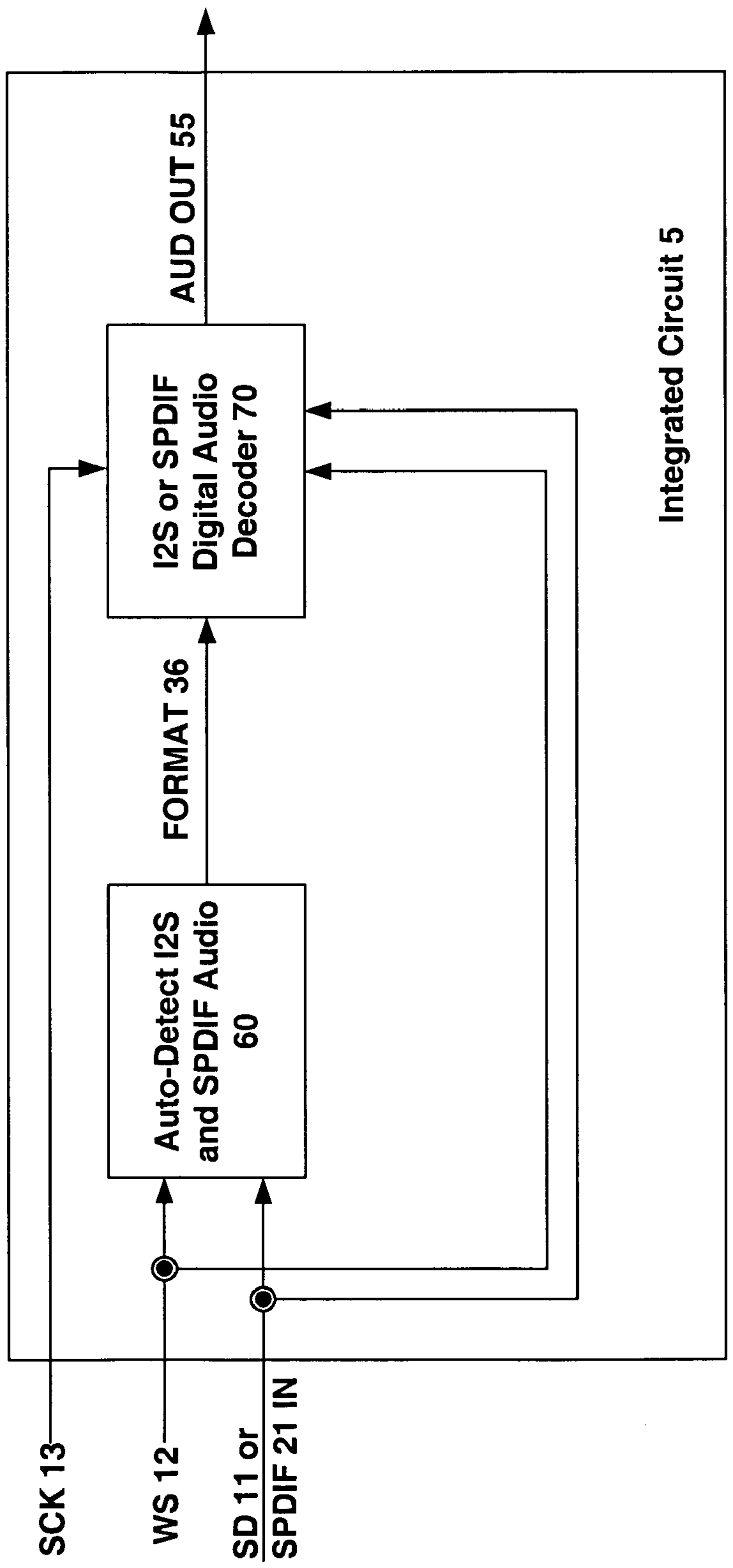
FIG. 6 is a block diagram illustrating the use of pin-sharing, and an alternative embodiment of audio input auto detection in accordance with the present invention.

The auto detection of digital audio input formats and pin sharing technique in accordance with the present invention can also be implemented in alternative embodiments. For example, as shown in FIG. 6, the auto detection element 60 can first determine the format of the input signal, and then have the rest of the circuitry of the integrated circuit process the input signal(s) in accordance with the detected format, reflected by format select signal 36. For example, in the case of decoding the digital input signal according to the correct format, an I2S or SPDIF digital audio decoder 70 can be provided to decode either an I2S signal or an SPDIF signal, based on the detected format signal 36.

This could be accomplished in several ways. According to one way, the portion of the integrated circuit other than the auto detect element 60 could reconfigure according to the format select signal 36, e.g., by changing a clock signal, decoding algorithm and/or the like. In other words, to the extent that decoders for different formats process and decode signals similarly, the differences can be set by circuitry responsive to the format select signal 36, through logic, software, or other signal processing reconfiguration technique.

Figure 7A:
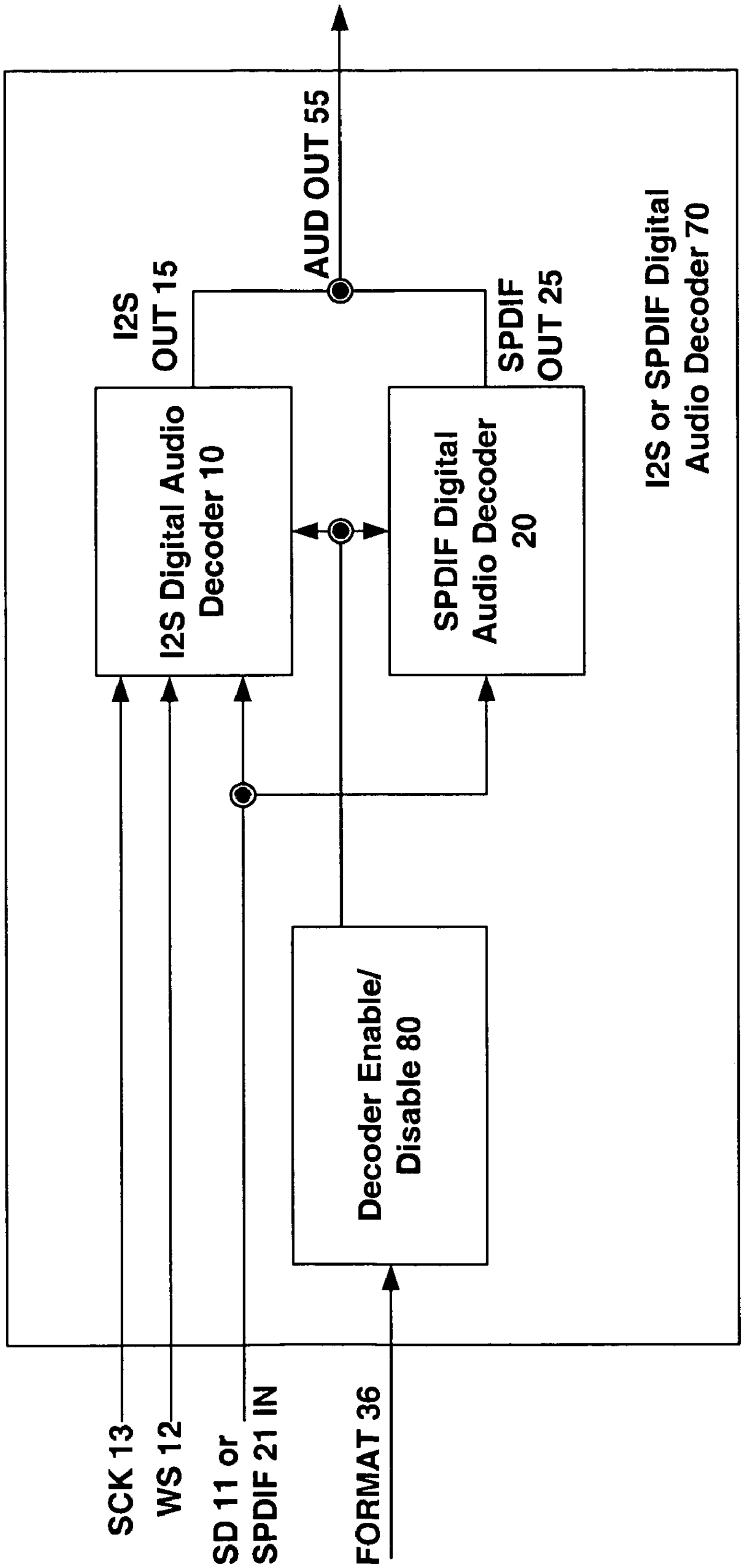
FIGS. 7A and 7B are block diagrams of alternate embodiments of a decoding portion of the integrated circuit in accordance with the present invention.
Figure 7B:
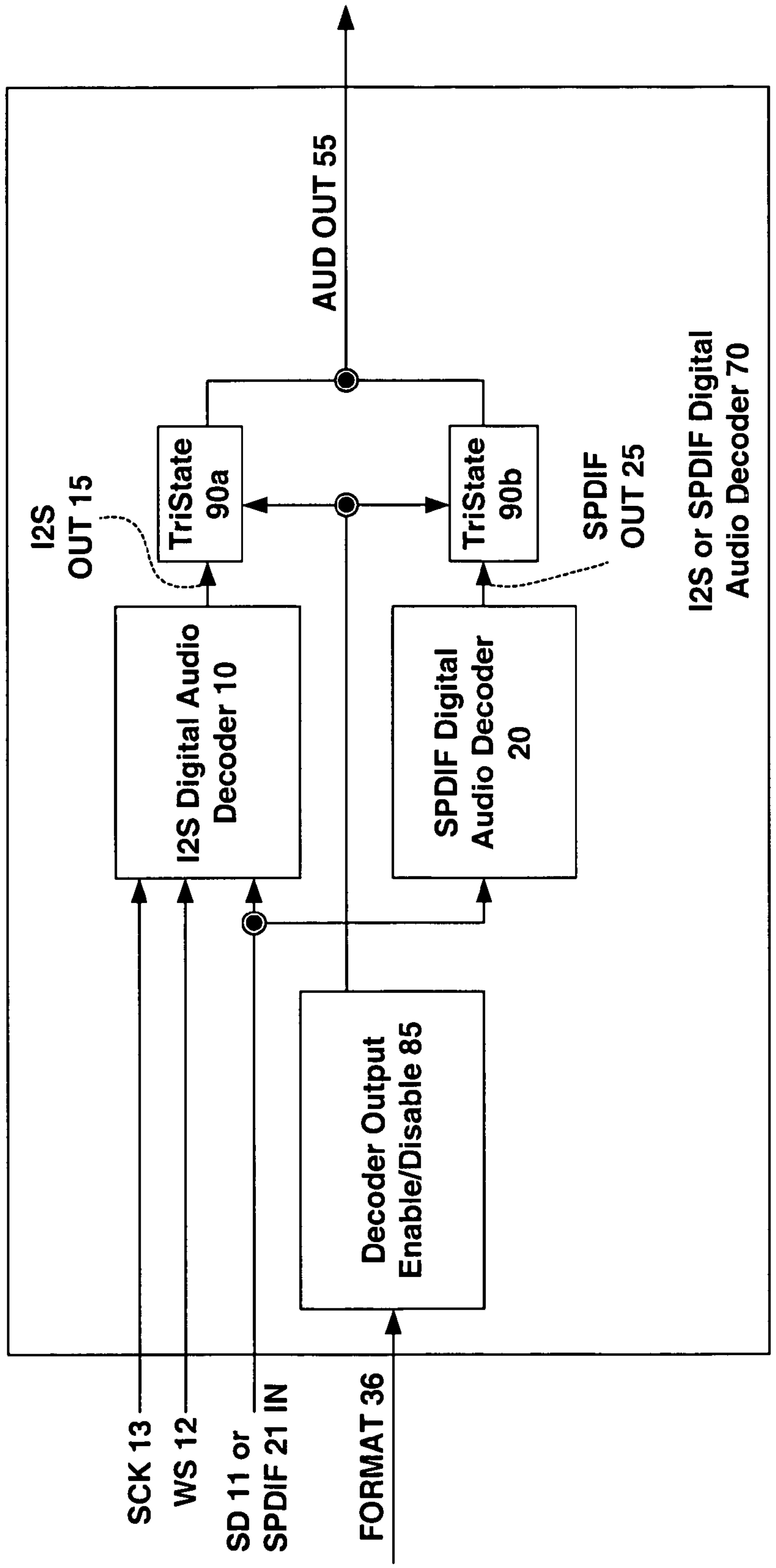

According to another embodiment, as shown in FIGS. 7A and 7B, the path that a signal takes through a circuit could change based on the format select signal 36. FIG. 7A shows one possibility for a block diagram illustrating the internal workings of an I2S or SPDIF digital audio decoder 70. As shown, to decode an input signal according to the I2S format if the auto detect outputs a format select signal 36 corresponding to I2S format, a decoder enable/disable element 80 can be provided to turn "on" the I2S decoder 10, and turn "off" the SPDIF decoder 20. In a like manner, to decode an input signal according to the SPDIF format, the decoder enable/disable element 80 would turn "on" the SPDIF decoder 20, and turn "off" the I2S decoder 10. Thus, the output signal would reflect a correctly decoded signal.

Alternatively, as shown in FIG. 7B, both decoders 10 and 20 could process the input signal as if the correct formats were input to the decoders. Only one decoder, however, performs the correct processing because, as a practical matter, only one input signal format will be input to the integrated circuit. Thus, a decoder output enable/disable 85 can be provided so that tristate 90A is enabled and tristate 90B is disabled when SPDIF audio is being decoded and tristate 90B is enabled and tristate 90B is disabled when I2S audio is being decoded. In this fashion, only one of I2S output 15 and SPDIF output 25 is electrically communicated to audio output signal 55, and it will be the correctly decoded signal. The tristates thus in effect shut off the signal that is not decoded correctly, and allow the correctly decoded signal to pass.

It can be appreciated by one of ordinary skill in the art of digital signal processing, that an auto-detect element 60 can comprise any sort of digital signal processing means capable of exploiting differences among multiple signals. In the case of I2S versus SPDIF signals, many such logic circuits and other processing means could be provided based on the various differences between the two signals described above and in their respective specifications. For example, a designer could exploit the fact that the SPDIF format has no WS 12 or SCK 13 signal. In a preferred embodiment, edge detection circuitry and a time counter are employed in auto detect element 60 to recognize multiple audio formats automatically. In this regard, an auto detect element 60 generally has been used to refer to a circuit element that receives at least one of multiple inputs, and outputs signal(s) indicative of the formatting of the input signal(s).

It will also be appreciated that the above design minimizes the number of input pins to integrated circuit 5. Pin sharing of SD input signal 11 and SPDIF input signal 21 reduces the number of integrated circuit 5 inputs pin by one, as described previously. In addition, no pin is required for the select signal 36, and consequently no external means for setting the select signal 35 is required. Also, SCK 13, WS 12, and only one of SD 11 or SPDIF 21 are the only inputs to the integrated circuit 5, thereby the number of pins is minimized. This minimum number is the greatest of the number of signals used to represent any one of the multiple input formats. In the case of I2S and SPDIF signals, this minimal number of input pins is three since the number of signals used to represent audio with the I2S standard is three i.e., three input pins are required to decode I2S formatted signals.

Figure 8A:
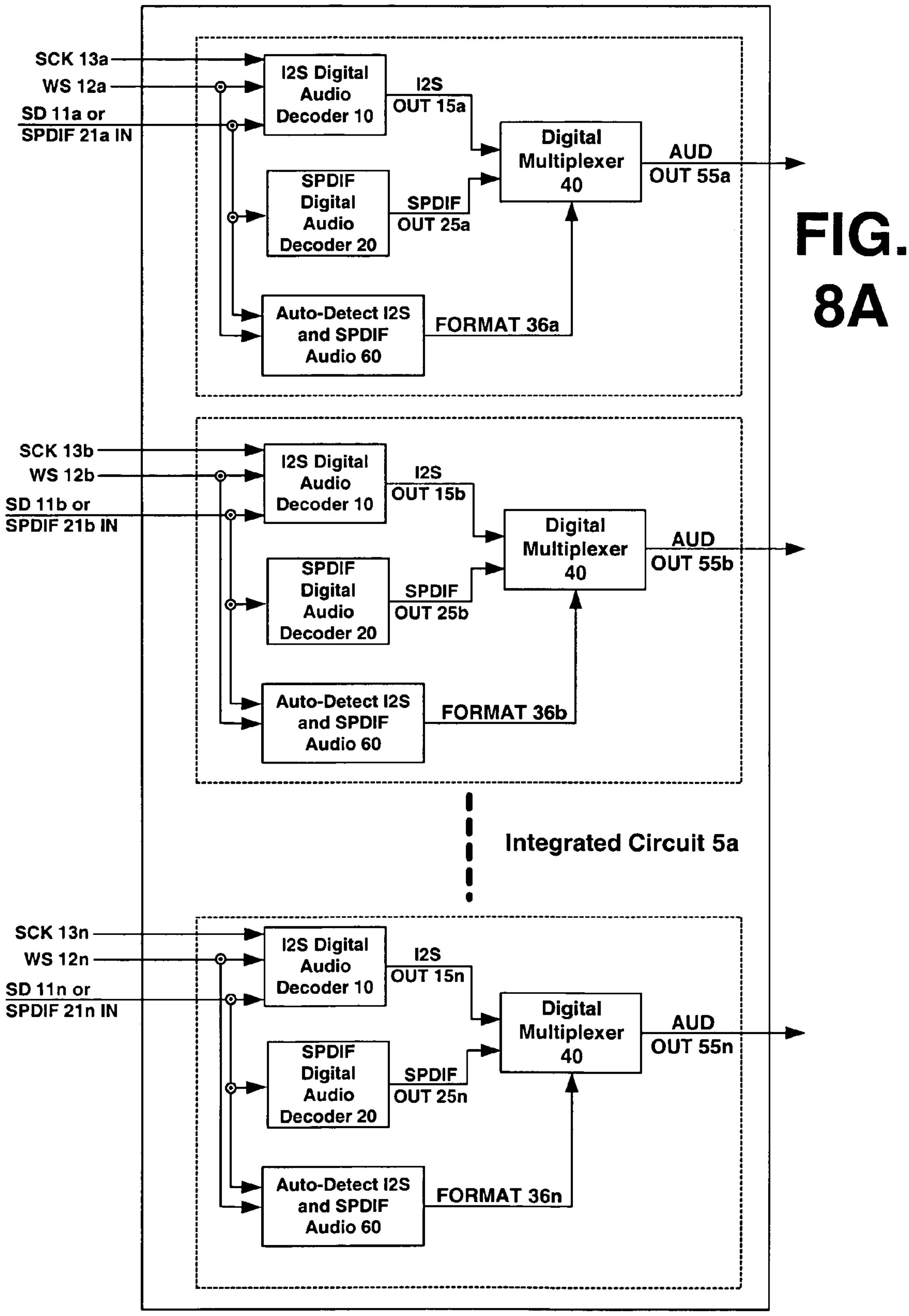
FIGS. 8A through 8C show an alternative embodiment of the present invention wherein the formats of multiple input signals are auto-detected on a single integrated circuit.
Figure 8B:
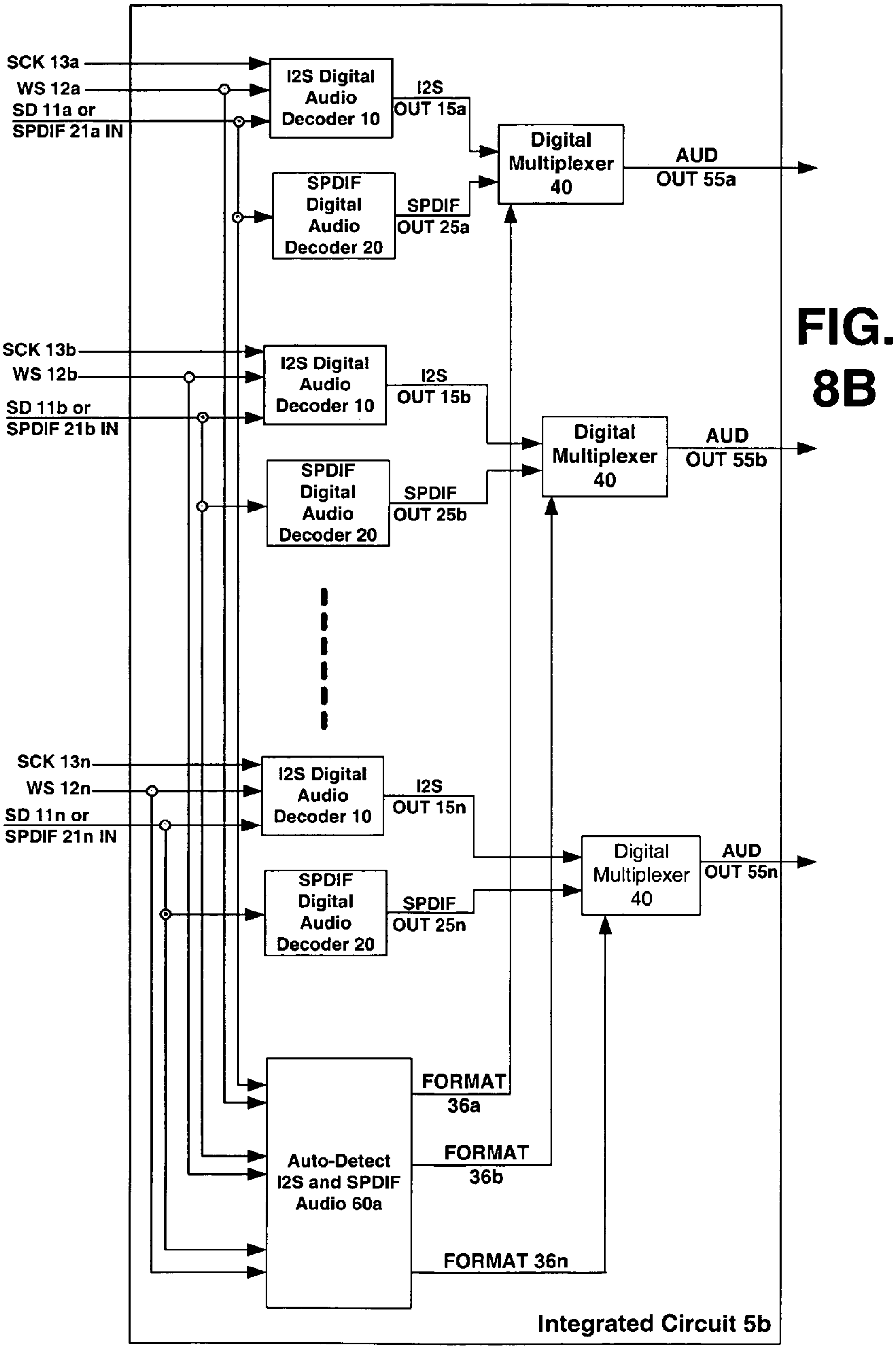
Figure 8C:
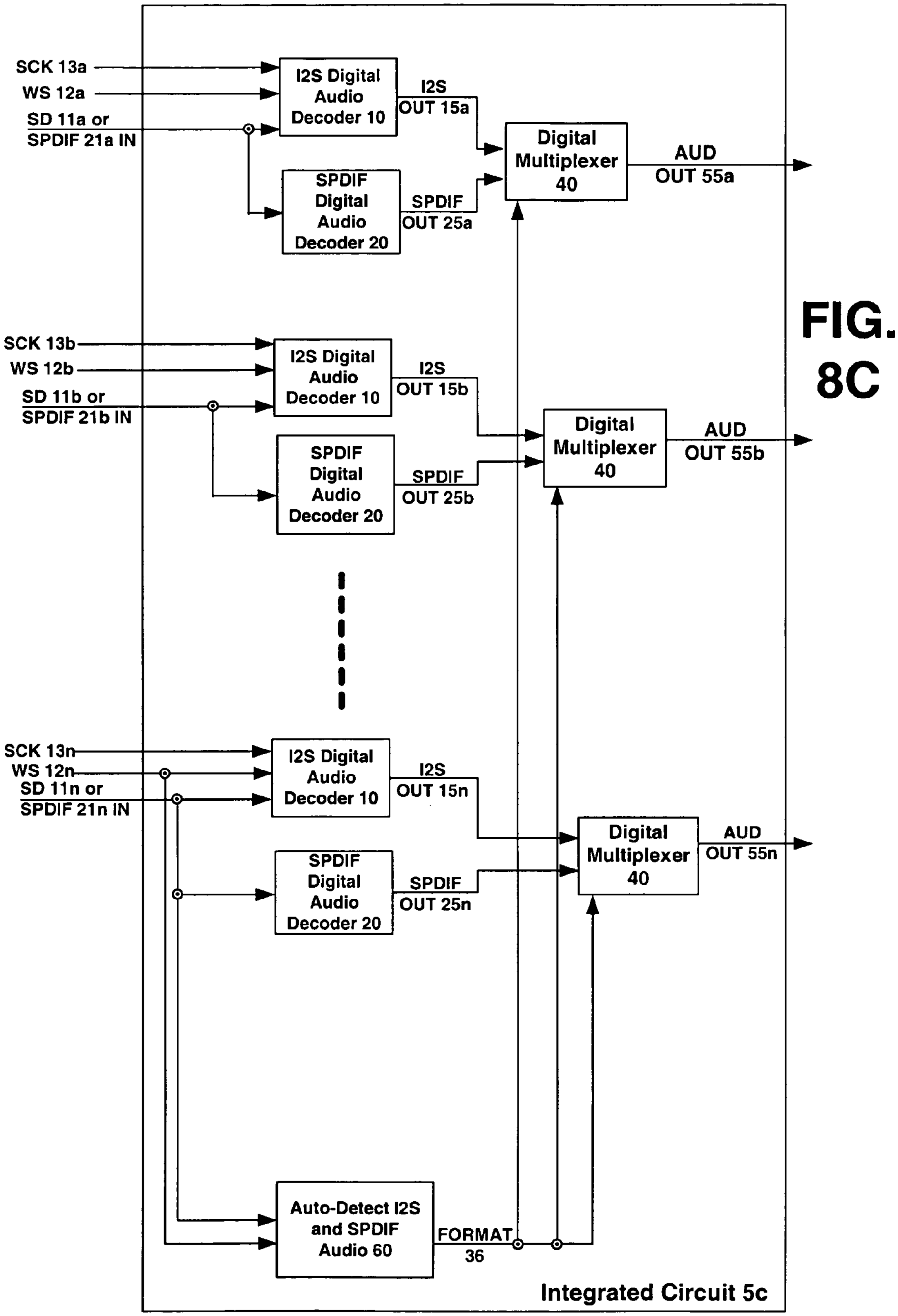

FIGS. 8A through 8C show an alternative embodiment of the present invention wherein the formats of multiple input signals are auto-detected. Rather than providing multiple integrated circuits 5, wherein each is provided on a separate chip, the present invention may also be employed in the context of auto-detecting audio input formats for multiple inputs on a single integrated circuit, thereby reducing design complexity.

FIG. 8A, e.g., illustrates the auto-detection of n inputs of unknown format that are input into integrated circuit 5*a*. Each audio input is auto-detected by a respective auto-detect I2S and SPDIF Audio 60, each generating a format select signal 36*a*, 36*b*, . . . . , 36*n*, corresponding to the auto-detected input. Thus, for each input, the format is auto-detected and an output is generated for correctly multiplexing the respective decoded input signals in accordance with the detected input format. FIG. 8A is thus one example of an alternative embodiment that demonstrates the utility of combining multiple FIG. 5 circuitry on a single chip, to auto-detect the formats of multiple input signals.

FIG. 8B also shows the auto-detection of n inputs of unknown formats input into a single integrated circuit 5*b*. Simplifying the design, a single auto-detect I2S and SPDIF audio 60*a* circuit is provided for detecting the formats of multiple inputs and outputting multiple format select signals 36*a*, 36*b*, . . . , 36*n*. These signals can then be employed to output correctly decoded inputs by multiplexing the respective decoded input signals according to the format signals 36*a*, 36*b*, . . . , 36*n*.

When a designer can make the assumption that the input signals all have the same input format, only one format select signal need be generated. Thus, FIG. 8C shows the auto-detection of n inputs of unknown formats input into a single integrated circuit 5*c* when it is known that all inputs are formatted according to the same standard. Under these circumstances, any one of the inputs can be routed to the auto-detect I2S and SPDIF audio 60 circuit to generate a format select signal 36, yet this format select signal 36 can be used to multiplex all of the respective decoded input signals. Thus, in accordance with alternative embodiments of the present invention, multiple digital audio input signals of unknown format can be advantageously auto-detected, processed and/or decoded on a single integrated circuit.

The present invention thus provides an efficient solution to the problem of input formatting that minimizes the number of inputs pins, through pin sharing and through the provision of an auto detect element 60. The present invention further eliminates the need for external select signal setting means, through the provision of auto detect element 60. The present invention also eliminates the need to manufacture separate integrated circuits for separate audio input formats, through the provision of pin sharing and the provision of all signal processing means in a single integrated circuit.

The various techniques described herein may be implemented with hardware or software, or with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer or the like, the machine becomes an apparatus for practicing the invention. When implemented on a general-purpose processor, the program code combines with the processor to provide a unique apparatus that operates analogously to specific logic circuits. For example, the detection of differences among multiple digital formats by auto-detect element 60 could be implemented via software, as could other elements of the present invention, such as decoders 10 and 20, etc.

Those skilled in the art will appreciate that numerous changes and modifications may be made to the preferred embodiments of the invention and that such changes and modifications may be made without departing from the spirit of the invention. For example, it should be noted that the present invention may be implemented in a variety of applications. In any design application in which a designer may be unaware of the format of an input signal regardless of the number of potential input formats, the invention may apply. The minimum number of input pins for the circuit will equal the highest number of signals used to represent a single audio format of all potential formats. In the I2S and SPDIF formatting example, this number was three since I2S signals are represented with three signals, but the present invention clearly can be employed with other input formats as well. The differences among the multiple input formats can then provide the basis for the auto-detect element 60 to generate a format select signal 36 for gating the correct signal to the output of the integrated circuit. It is therefore intended that the appended claims cover all such equivalent variations as fall within the true spirit and scope of the invention.

What is claimed is:

1. An input auto detect circuit that identifies and selects an input signal of a particular input format, comprising:
   - a selection device, configured to receive a first set of audio input signals having an I2S format and a second set of audio input signals having a SPDIF format, that selects one of said I2S and SPDIF formats in response to a format select signal; and
   - an auto detect element responsive to said first and second sets of audio signals so as to generate said format select signal as an indication of which of said I2S and SPDIF formats is being received by said circuit.

2. An input auto detect circuit according to claim 1, wherein said input auto detect circuit is provided in an integrated circuit chip and at least one signal of said first set of audio input signals shares an integrated circuit pin with at least one signal of said second set of audio input signals.

3. An input auto detect circuit according to claim 2, wherein a sample data carrying signal of the first set of audio input signals is shared with a sample data carrying signal of the second set of audio input signals.

4. An input auto detect circuit according to claim 3, wherein an SD input signal of an I2S formatted audio signal shares an input pin of said integrated circuit chip with an SPDIF input signal of an SPDIF formatted audio signal.

5. An input auto detect circuit according to claim 1, wherein a number of input pins is equal to the greater of a number of signals in said first set and the number of audio signals in said second set.

6. An input auto detect circuit according to claim 5, wherein the number of input pins to the input auto detect circuit is three.

7. An input auto detect circuit according to claim 1, wherein multiple audio inputs, including one of said first set and second set of audio input signals, are input to said input auto detect circuit.

8. An input auto detect circuit according to claim 7, wherein said generated format select signal indicates the format of each of said multiple audio inputs.

9. An input auto detect circuit according to claim 7, wherein at least one signal from each of said multiple audio inputs are received by said auto-detect element,
   - and said auto-detect element generates multiple format select signals, one for each of said multiple audio inputs, and each of said multiple format select signals being an indication of which of said I2S and SPDIF formats is being received by said input auto detect circuit for each of said respective multiple audio inputs.

10. An input auto detect circuit according to claim 1, wherein the circuit reconfigures audio input signal processing paths in response to said format select signal.

11. An input auto detect circuit according to claim 10, wherein an audio input follows a first decoding path according to an I2S format indicated by said format select signal and a second decoding path according to a SPDIF format indicated by said format select signal.

12. An input auto detect circuit according to claim 11, further comprising tristate elements.

13. An audio input auto detect circuit, comprising:
   - an I2S decoder that decodes an I2S signal including a clock signal, word select signal and an I2S data carrying signal so as to produce an I2S output signal;
   - an SPDIF decoder that decodes an SPDIF signal to produce an SPDIF output signal;
   - an auto detect element that receives said word select signal and one of said I2S data carrying signal and said SPDIF input signal, detects whether the signal is formatted according to the I2S format or SPDIF format, and outputs a format select signal corresponding to the detected format; and
   - a multiplexer for gating one of said I2S output signal and said SPDIF output signal according to said format select signal.

14. An audio input auto detect circuit, comprising:
   - an I2S decoder for decoding an I2S signal including a clock signal, word select signal and an I2S data carrying signal so as to produce an I2S output signal;
   - an SPDIF decoder for decoding an SPDIF signal to produce an SPDIF output signal; and
   - an auto detect element that receives said word select signal and one of said I2S data carrying signal and said SPDIF input signal, detects whether the signal is formatted according to the I2S format or SPDIF format, and outputs a format select signal corresponding to the detected format;
   - wherein the circuit reconfigures an input processing path so as to decode an input signal with said I2S decoder when said format signal indicates I2S formatting and to decode an input signal with said SPDIF decoder when said format signal indicates SPDIF formatting.

15. A method for detecting multiple audio input formats within a single integrated circuit, comprising the steps of:

receiving into said integrated circuit one of a first set of input signals corresponding to a first audio input interface format and a second set of input signals corresponding to a second audio input interface format to first and second decoders, respectively;

after said receiving, detecting the interface format of the input with an auto detect element responsive to at least one signal of said first and second sets of input signals, wherein the auto detect element detects the format using a time counter and input signal edge detection circuitry; and generating a format select signal in response to said detecting; and selecting with a selection device between an output of the first decoder and an output of the second decoder in response to said format select signal.

16. A method for detecting multiple audio input formats within a single integrated circuit as recited in claim 15, wherein multiple format select signals are generated in response to auto-detecting the interface format of each of multiple inputs, and wherein said multiple format select signals indicate the interface format of said multiple inputs, respectively.

17. A method for detecting multiple audio input formats within a single integrated circuit as recited in claim 15, wherein said format select signal is generated in response to auto-detecting the interface format of one of multiple inputs, and wherein said multiple format select signal indicates the interface format of each of said multiple inputs.

18. A method for detecting multiple audio input formats within a single integrated circuit, comprising the steps of:

receiving into said integrated circuit one of a first set of input signals corresponding to a SPDIF input format and a second set of input signals corresponding to an I2S input format to first and second decoders, respectively;

after said receiving, detecting the interface format of the input with an auto detect element responsive to at least one signal of said first and second sets of input signals;

generating a format select signal in response to said detecting; and reconfiguring with a selection device the audio input signal processing paths in response to said format select signal.

* * * * *